(12) United States Patent
Prasad et al.

(10) Patent No.: US 10,616,880 B2
(45) Date of Patent: *Apr. 7, 2020

(54) SIGNALLING FOR COORDINATED MULTI-POINT TRANSMISSION AND RECEPTION (COMP)

(71) Applicant: NEC Corporation, Tokyo (JP)

(72) Inventors: Narayan Prasad, Wyncote, PA (US); Mohammad Khojastepour, Lawrenceville, NJ (US); Mustafa Arslan, Princeton, NJ (US); Karthikeyan Sundaresan, Howell, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,934

(22) Filed: Dec. 29, 2017

(65) Prior Publication Data

US 2018/0124780 A1 May 3, 2018

Related U.S. Application Data

(63) Continuation of application No. 14/661,036, filed on Mar. 18, 2015, now Pat. No. 9,888,469.
(Continued)

(51) Int. Cl.
*H04W 4/00* (2018.01)
*H04W 72/04* (2009.01)
(Continued)

(52) U.S. Cl.
CPC ........ *H04W 72/0433* (2013.01); *H04B 7/024* (2013.01); *H04L 5/0035* (2013.01);
(Continued)

(58) Field of Classification Search
CPC .......... H03M 13/1134; H03M 13/116; H03M 13/1165; H03M 13/255; H03M 13/27;
(Continued)

(56) References Cited

U.S. PATENT DOCUMENTS

| 6,714,514 B1 | 3/2004 | Espax et al. |
| 8,995,400 B2 | 3/2015 | Geirhofer et al. |

(Continued)

FOREIGN PATENT DOCUMENTS

| CN | 101895921 A | 11/2010 |
| CN | 101960737 A | 1/2011 |

(Continued)

OTHER PUBLICATIONS

First Office Action, dated Sep. 4, 2018, issued by The State Intellectual Property Office of the People's Republic of China in counterpart Chinese Patent Application No. 201580014066.9.

(Continued)

*Primary Examiner* — Minh Trang T Nguyen
(74) *Attorney, Agent, or Firm* — Finnegan, Henderson, Farabow, Garrett & Dunner, L.L.P.

(57) ABSTRACT

In a wireless communications system including a first transmission point and a second transmission point, a wireless communications method implemented in the first transmission point supporting coordinated multi-point transmission and reception (CoMP) is disclosed. The wireless communications method comprises transmitting to the second transmission point one or more CoMP hypothesis sets, and transmitting to the second transmission point a benefit metric corresponding to each CoMP hypothesis set, wherein the benefit metric can be a negative value. Other methods, systems, and apparatuses also are disclosed.

22 Claims, 6 Drawing Sheets

Related U.S. Application Data

(60) Provisional application No. 62/056,095, filed on Sep. 26, 2014, provisional application No. 62/055,381, filed on Sep. 25, 2014, provisional application No. 62/034,885, filed on Aug. 8, 2014, provisional application No. 62/034,724, filed on Aug. 7, 2014, provisional application No. 61/991,323, filed on May 9, 2014, provisional application No. 61/991,055, filed on May 9, 2014, provisional application No. 61/955,559, filed on Mar. 19, 2014.

(51) Int. Cl.
*H04B 7/024* (2017.01)
*H04L 5/00* (2006.01)
*H04B 7/06* (2006.01)
*H04W 72/08* (2009.01)

(52) U.S. Cl.
CPC .......... *H04L 5/0096* (2013.01); *H04B 7/063* (2013.01); *H04B 7/0626* (2013.01); *H04B 7/0632* (2013.01); *H04L 5/0007* (2013.01); *H04L 5/0032* (2013.01); *H04L 5/0073* (2013.01); *H04W 72/0426* (2013.01); *H04W 72/082* (2013.01)

(58) Field of Classification Search
CPC .......... H03M 13/271; H03M 13/2792; H03M 13/296; H03M 13/356; H03M 13/6552; H04L 1/0045; H04L 1/0061
See application file for complete search history.

(56) References Cited

U.S. PATENT DOCUMENTS

| | | | |
|---|---|---|---|
| 9,125,197 | B2 | 9/2015 | Liao et al. |
| 9,385,791 | B2 | 7/2016 | Etemad et al. |
| 2012/0282934 | A1 | 8/2012 | Simonsson et al. |
| 2012/0287799 | A1 | 11/2012 | Chen et al. |
| 2012/0327908 | A1 | 12/2012 | Gupta et al. |
| 2013/0028109 | A1 | 1/2013 | Jöngren et al. |
| 2013/0058307 | A1 | 3/2013 | Kim et al. |
| 2013/0077513 | A1 | 3/2013 | Ng et al. |
| 2013/0114427 | A1 | 5/2013 | Maattanen et al. |
| 2013/0114517 | A1 | 5/2013 | Blankenship et al. |
| 2013/0115989 | A1 | 5/2013 | Yamazaki et al. |
| 2013/0156001 | A1 | 6/2013 | Gomadam |
| 2013/0196675 | A1 | 8/2013 | Xiao et al. |
| 2013/0208678 | A1 | 8/2013 | Zhang |
| 2013/0242748 | A1 | 9/2013 | Mangalvedhe et al. |
| 2013/0242902 | A1 | 9/2013 | Liu et al. |
| 2013/0267268 | A1 | 10/2013 | Lee et al. |
| 2013/0303180 | A1 | 11/2013 | Wang et al. |
| 2013/0322376 | A1 | 12/2013 | Marinier et al. |
| 2013/0336214 | A1 | 12/2013 | Sayana et al. |
| 2013/0337818 | A1 | 12/2013 | Biermann et al. |
| 2014/0036664 | A1 | 2/2014 | Han et al. |
| 2014/0073313 | A1 | 3/2014 | Hammarwall et al. |
| 2014/0078989 | A1 | 3/2014 | Guo et al. |
| 2014/0192759 | A1 | 7/2014 | Son et al. |
| 2014/0226612 | A1 | 8/2014 | Kim et al. |
| 2014/0254531 | A1 | 9/2014 | Lee et al. |
| 2014/0254708 | A1 | 9/2014 | Seo et al. |
| 2014/0269300 | A1 | 9/2014 | Bennis |
| 2014/0293843 | A1 | 10/2014 | Papasakellariou et al. |
| 2015/0049626 | A1 | 2/2015 | Chen et al. |
| 2015/0063222 | A1 | 3/2015 | Wang et al. |
| 2015/0063287 | A1 | 3/2015 | Mazzarese et al. |
| 2015/0200757 | A1 | 7/2015 | Wu et al. |
| 2015/0215934 | A1 | 7/2015 | Davydov et al. |
| 2015/0237520 | A1 | 8/2015 | Jöngren et al. |
| 2015/0349908 | A1 | 12/2015 | Centonza et al. |
| 2016/0028448 | A1* | 1/2016 | Park .................. H04B 7/26 375/267 |
| 2016/0037511 | A1 | 2/2016 | Vincze et al. |
| 2016/0037541 | A1 | 2/2016 | Kim et al. |
| 2016/0044650 | A1 | 2/2016 | Enescu et al. |
| 2016/0119037 | A1 | 4/2016 | Won et al. |
| 2016/0150512 | A1 | 5/2016 | Zhang et al. |
| 2016/0218841 | A1 | 7/2016 | Centonza et al. |
| 2017/0237535 | A1 | 8/2017 | Park et al. |

FOREIGN PATENT DOCUMENTS

| | | |
|---|---|---|
| CN | 102130708 A | 7/2011 |
| CN | 102195915 A | 9/2011 |
| CN | 102647751 A | 8/2012 |
| CN | 102696256 A | 9/2012 |
| CN | 103650379 A | 3/2014 |
| JP | 2003-29970 | 1/2003 |
| JP | 2011-530133 | 12/2011 |
| JP | 2014-530551 A | 11/2014 |
| KR | 10-2013-0101294 | 9/2013 |
| KR | 10-2014-0099265 | 8/2014 |
| RU | 2387082 | 4/2010 |
| WO | WO 02-093819 | 11/2002 |
| WO | WO 03-019813 | 3/2003 |
| WO | WO 2010-129400 | 11/2010 |
| WO | WO 2011/083774 | 7/2011 |
| WO | WO 2013/044808 A1 | 4/2013 |
| WO | WO 2013/118567 A1 | 8/2013 |
| WO | WO 2013/137796 | 9/2013 |
| WO | WO 2013/170202 A1 | 11/2013 |
| WO | WO 2014/021610 A1 | 2/2014 |
| WO | WO 2014/115374 | 7/2014 |
| WO | WO 2014/139588 | 9/2014 |
| WO | WO 2015/032802 A1 | 3/2015 |
| WO | WO 2016/021880 A1 | 2/2016 |

OTHER PUBLICATIONS

European Office Action issued by the European Office Action in counterpart European Patent Application No. 15 764 646.4, dated Dec. 21, 2018.
Decision to Grant dated Apr. 4, 2019, from the Russian Patent Office in corresponding Russian Patent Application No. RU 2018112742.
Notification of Reasons for Refusal dated Aug. 7, 2018 issued by the Japanese Patent Office in counterpart Japanese Patent Application No. 2017-507948.
3GPP TSG RAN WG3 Meeting #85 R3-141833 ; Dresden, Germany, Aug. 18-22, 2014; Alcatel-Lucent, Alcatel-Lucent Shanghai Bell.
Notification of Reasons for Refusal dated Jul. 3, 2018 issued by the Japanese Patent Office in counterpart Japanese Patent Application No. 2017-088564.
Samsung, "Introduction of inter-eNB CoMP signaling", R3-141412, 3GPP TSG-RAN WG3 Meeting #84. Seoul, Korea May 19-23, 2014.
Fujitsu, "Discussion on Stage 3 completion for Inter-eNB CoMP", R3-141139, 3GPP TSG-RAN WG3 #83, Seoul, Korea, May 19-23, 2014.
NSN' "Signaling Framework for Inter-eNB CoMP". R3-141183, 3GPP TSG-RAN WG3 Meeting #84, Seoul, Korea, May 19-23, 2014.
Notification of Reasons for Refusal dated Jun. 26, 2018, issued by the Japanese Patent Office in counterpart Japanese Patent Application No. 2017-178902.
Chinese First Office Action dated Mar. 1, 2019, issued by The State Intellectual Property Office (Chinese Patent Office) in related Chinese Patent Application No. 201580014894.2.
First Office Action, dated Mar. 4, 2019, issued by The State Intellectual Property Office of the People's Republic of China in counterpart Chinese Patent Application No. 201580014895.7.
NEG, 'Signaling Considerations for CoMP with non-ideal backhaul', R1-140421, 3GPP TSG RAN WG1 Meeting #76, Prague, Czech Republic, Jan. 31, 2014. See pp. 1-4.
Alcatel-Lucent Shanghai Bell et al., 'Performance Evaluation of X2 signalling Supporting DL eCoMP with NIB', R1-135179, 3GPP TSG RAN WG1 Meeting #75, San Francisco, USA, Nov. 2, 2013, See p. 3.

(56) References Cited

OTHER PUBLICATIONS

Samsung, "Inter-eNB CoMP for LTE", RP-140053, 3GPP TSG RAN Meeting #63, Fukuoka, Japan, Feb. 25, 2014 (see pp. 3-4).
H. Zhang, L. Venturino, N. Prasad, P. Li, S. Rangarajan, X. Wang,"Weighted Sum-Rate Maximization i Multi-Cell Networks via Coordinated Scheduling and Discrete Power Control", IEEE Journal on Selected Areas in Communications, 29(6): pp. 1214-1224,2011.
R1-141816, "LS on Inter-eNB CoMP for LTE," RAN1, Mar. 31-Apr. 4, 2014.
R3-141487, "Change Request," Mar. 31-Apr. 4, 2014.
R1-141206, "Signaling Considerations for Inter-eNB CoMP", NEC, Mar. 31-Apr. 4, 2014.
Non-Final Office Action dated Aug. 8, 2016, in U.S. Appl. No. 14/661,236.
Non-Final Office Action dated Jan. 10, 2017, in U.S. Appl. No. 14/856,310.
Non-Final Office Action dated Jan. 9, 2017, in U.S. Appl. No. 14/856,284.
Non-Final Office Action dated Jan. 23, 2017, in U.S. Appl. No. 14/856,292.
Japanese Office Action issued by the Japanese Patent Office in counterpart Japanese Patent Application No. 2016-558047, dated Feb. 21, 2017.
Sung Hwan Won, "Status Report to TSG", Inter-eNB CoMP for LTE, 3GPP TSG RAN meeting #63, RP-140053, pp. 1-6, Mar. 6, 2014.
Japanese Official Action issued by the Japanese Patent Office in counterpart Japanese Patent Application No. 2016-565143, dated Apr. 18, 2017.
Samsung, "WI kickoff: Enhanced signaling for inter-eNB CoMP", 3GPP, TSG-RAN WG3 #85, R3-141753, 5 pages, (2014).
NTT Docomo, "Details on Backhaul Signaling for Inter-eNB CoMP", 3GPP, TSG-RAN WG1 Meeting #76bis, R1-141471, pp. 1-4, (2014).
Non-Final Office Action dated Jul. 13. 2017 in related U.S. Appl. No. 14/661,236.
Finai Office Action dated Jul. 14, 2017 in related U.S. Appl. No. 14/856,292.
Notification of Reasons for Refusal dated Aug. 8, 2017, by the Japanese Patent Office in counterpart Japanese Patent Application No. 2016-557306.
Qualcomm Incorporated, Parameters for backhaul signaling, 3 GPP TSG-RAN WG1 ** 76, R1-140456 Feb. 10, 2014.
Notification of Reasons for Refusal dated Oct. 18, 2016, by the Korean Patent Office in counterpart Korean Patent Application No. 10-2016-7025283.
Notification of Reasons for Refusal dated Feb. 9, 2017 by the Japanese Patent Office in counterpart Japanese Patent Application No. 2016-558047.
NSN, Nokia, "Simulation Results for CoMP scenario.2 with non-ideal backhaul", Discussion and Decision, 3GPP TSG RAN WG1 Meeting #75, R1-136023, 6.2.9.1, 6 pages, (2013).
Alcatel-Lucent et al., "Proposed signalling information supporting eCoMP with NIB", Discussion/Decision, 3GPP TSG RAN WG1 Meeting #76, R1-140168, Agenda Item: 7.2.6, 6 pages, (2014).
Samsung, "Use of SRS received power for Inter-eNB CoMP", Discussion and Decision, 3GPP TSG RAN WG1 Meeting #76, R1-140379, Agenda Item: 7.2.6, 5 pages, (2014).
ZTE, "Remaining details on inter-eNB CoMP Signalling", Discussion and Decision, 3GPP TSG RAN WG1 Meeting #76bis, R1-141408, Agenda Item: 7.2.6, 4 pages, (2014).
Alcatel-Lucent, et al, "Signalling Details and Procedures Supporting eCoMP", Discussion/Decision, 3GPP TSG RAN WG1 Meeting #76bis, R1-141725, Agenda Item: 7.2.6, 9 pages, (2014).

Ericsson, et al., "3GPP TSG-RAN3 Meeting #84", Discussions & Approval, 3GPP TSG-RAN3 Meeting #84, R3-141304, Agenda Item; 14, 7 pages, (2014).
Qualcomm Incorporated, "Introduction of inter-eNB CoMP", 3GPP TSG-RAN WG3 Meeting #85, R3-141749, Current version: 12.2.0, 19 pages, (2014).
Samsung, "Introduction of enhanced inter-eNB CoMP signaling", 3GPP TSG-RAN WG3 Meeting #85, R3-141754, Current version: 12.2.0, 13 pages, (2014).
Ericsson, "Inter eNB CoMP Technical Aspects: the fall of FFSs", Discussions & Approval, 3GPP TSG-RAN3 Meeting #84, R3-141880, Agenda Item: 14, 6 pages, (2014).
Samsung, "Definition of UE ID and semantics TP", Approval, 3GPP TSG-RAN WG3 #85, R3-141989, Agenda Item: 14.2, 2 pages, (2014).
Samsung, "Way forward on WI: Inter-eNB CoMP for LTE in RAN3#85". Approval, 3GPP TSG-RAN WG3 #85, R3-142107. Agenda Item: 14, 1 page, (2014).
International Search Report dated Jun. 12, 2015, in corresponding PCT International Application No. PCT/US2015/021369.
International Search Report dated May 28, 2015, in corresponding PCT International Application No. PCT/US2015/021372.
International Search Report dated Feb. 23, 2016, in corresponding PCT International Application No. PCT/US2015/050554.
International Search Report dated Feb. 23, 2016, in corresponding PCT International Application No. PCT/US2015/050555.
International Search Report dated Feb. 26, 2016, in corresponding PCT International Application No. PCT/US2015/050557.
Notice of Allowance for Patent dated Mar. 24, 2017, by the Korean Intellectual Property Office in counterpart Korean Patent Application No. 10-2016-7025283.
Supplementary European Search Report issued by the European Patent Office in counterpart European Patent Application No. 15 84 4687, dated Aug. 17, 2017.
Extended European Search Report form the European Patent Office dated Oct. 4. 2017, in counterpart European Patent Application No. 15843576.8.
Alcatel-Lucent et al., "Introduction of enhanced RNTP and UE-CSI reporting", 3GPP TSG RAN WG3 Meeting #85; R3-141834, Aug. 2014.
Alcatel-Lucent et al., "Introduction of signaling for US-CSI information", 3GPP-TSG RAN WG3 Meeting #85; R3-141635, Aug. 17, 2014.
Nokia Networks, "Text Proposal for subband definition", 3GPP TSG RAN WG2 Meeting #88; R3-151211, May 29, 2015.
Notification of Reasons for Refusal dated Oct. 3, 2017 issued by the Japanese Patent Office in counterpart Japanese Patent Application No. 2017-507948.
Extended European Search Report from the European Patent Office dated Oct. 11, 2017, in counterpart European Patent Application No. 15764646.4.
NSN, "Signaling framework for inter-eNB CoMP based on Coordinated Muting", 3GPP TSG-RAN WG3 Meeting #83; R3-140181, 11 pages, Feb. 9, 2014.
NSN, "X2AP support for Inter-eNB CoMp", 3GPP TSG-RAN3 Meeting #84; RS-141184, 11 pages, May 18, 2014.
English-language translation of Russian Office Action dated Oct. 12, 2017, in counterpart Russian Patent Application No. RU 2016-140853.
Office Action dated Nov. 26, 2019, by the Indian Patent Office in counterpart Indian Patent Application 201617029311.
Office Action dated Jan. 23, 2020, by the Indian Patent Office in counterpart Indian Patent Application 201617030231.

* cited by examiner

SIGNALLING FOR COORDINATED MULTI-POINT TRANSMISSION AND RECEPTION (COMP)

CROSS-REFERENCE TO RELATED PATENT APPLICATIONS

This application is a continuation of U.S. patent application Ser. No. 14/661,036 filed Mar. 18, 2015, which claims the benefit of Provisional Application Nos. 61/955,559 filed Mar. 19, 2014, 61/991,055, filed May 9, 2014, 61/991,323, filed May 9, 2014, 62/034,724, filed Aug. 7, 2014, 62/034,885, filed Aug. 8, 2014, 62/055,381, filed Sep. 25, 2014, and 62/056,095, filed Sep. 26, 2014. The entire contents of the above-referenced applications are expressly incorporated herein by reference.

BACKGROUND OF THE INVENTION

The present invention relates to coordinated multi-point transmission and reception (CoMP) in wireless or mobile communications and, more particularly, to inter-eNB (E-UTRAN NodeB or eNodeB) CoMP with Network Assisted Interference Cancellation and Suppression (NA-ICS) and/or non-ideal backhaul (NIB).

The CoMP schemes that were discussed during the 3rd Generation Partnership Project (3GPP) Release 11 CoMP standardization assumed the availability of an ideal backhaul connecting the transmission points in each cluster. This assumption allowed for coordination within the cluster based on the instantaneous channel state information (CSI) reported by the users to those transmission points. Unfortunately, such schemes are far from being suitable when faced with a non-ideal backhaul that has a high latency. To guide the design of schemes that are appropriate for the NIB scenario, the following agreement was reached during 3GPP RAN1 (Radio Access Network Working Group 1 or Radio Layer 1) Meeting #74:

For each evaluated scheme, information relating to a transmission to/from a serving node in a given subframe should be categorized into two groups:

Group 1 information: information which is considered valid for a period longer than the backhaul delay, which may therefore be provided from a different node(s) from the serving node; and Group 2 information: information which is considered valid for a period shorter than the backhaul delay, which must therefore be derived by the serving node.

The types of information may include for example:
CSI,
Allocated power per resource (including muting),
User equipment (UE) selection,
Precoding selection (including the number of transmit layers),
Modulation and coding scheme (MCS) selection,
Hybrid automatic repeat request (HARQ) process number, and
Transmission point (TP) selection.

Transmission layers are sometimes called "transmit layers" or "layers." The number of transmission layers is known as "transmission rank" or "rank." A codebook is a set of precoding matrices or precoders. A precoding matrix is also known as a codeword.

REFERENCE

[1] H. Zhang, L. Venturino, N. Prasad, P. Li, S. Rangarajan, X. Wang, "Weighted Sum-Rate Maximization in Multi-Cell Networks via Coordinated Scheduling and Discrete Power Control", IEEE Journal on Selected Areas in Communications, 29(6): pp. 1214-1224, 2011.

[2] R1-141816, "LS on Inter-eNB CoMP for LTE," RAN1, Mar. 31-Apr. 4, 2014.

[3] R3-141487, "CHANGE REQUEST," Mar. 31-Apr. 4, 2014.

[4] R1-141206, "Signaling Considerations for Inter-eNB CoMP", NEC, Mar. 31 to Apr. 4, 2014.

BRIEF SUMMARY OF THE INVENTION

An objective of the present invention is to provide a suitable scheme for CoMP operation.

An aspect of the present invention includes, in a wireless communications system including a first transmission point and a second transmission point, a wireless communications method implemented in the first transmission point supporting coordinated multi-point transmission and reception (CoMP). The wireless communications method comprises transmitting to the second transmission point one or more CoMP hypothesis sets, and transmitting to the second transmission point a benefit metric corresponding to each CoMP hypothesis set, wherein the benefit metric can be a negative value.

Another aspect of the present invention includes, in a wireless communications system including a first transmission point and a second transmission point, a wireless communications method implemented in the second transmission point supporting coordinated multi-point transmission and reception (CoMP). The wireless communications method comprises receiving from the first transmission point one or more CoMP hypothesis sets, and receiving from the first transmission point a benefit metric corresponding to each CoMP hypothesis set, wherein the benefit metric can be a negative value.

Still another aspect of the present invention includes a first transmission point supporting coordinated multi-point transmission and reception (CoMP) and used in a wireless communications system. The first transmission point comprises a transmitter to transmit to a second transmission point one or more CoMP hypothesis sets and a benefit metric corresponding to each CoMP hypothesis set, wherein the benefit metric can be a negative value.

Still another aspect of the present invention includes a second transmission point supporting coordinated multi-point transmission and reception (CoMP) and used in a wireless communications system. The second transmission point comprises a receiver to receive from a first transmission point one or more CoMP hypothesis sets and a benefit metric corresponding to each CoMP hypothesis set, wherein the benefit metric can be a negative value.

Still another aspect of the present invention includes a wireless communications method implemented in a wireless communications system supporting coordinated multi-point transmission and reception (CoMP). The wireless communications method comprises transmitting from a first transmission point to a second transmission point one or more CoMP hypothesis sets, and transmitting from the first transmission point to the second transmission point a benefit metric corresponding to each CoMP hypothesis set, wherein the benefit metric can be a negative value.

Still another aspect of the present invention includes a wireless communications system supporting coordinated multi-point transmission and reception (CoMP). The wireless communications system comprises a first transmission point, and a second transmission point to receive form the first transmission point one or more CoMP hypothesis sets, wherein the first transmission point transmits to the second transmission point a benefit metric corresponding to each CoMP hypothesis set, and wherein the benefit metric can be a negative value.

Still another aspect of the present invention includes a wireless communications method implemented in a transmission point (TP) used in a wireless communications system. The wireless communications method comprises receiving, from another TP, channel state information (CSI) for a user equipment (UE), and receiving, from said another TP, user identification for the user equipment, wherein the signaling of the CSI for the user equipment enables user identification for the user equipment.

Still another aspect of the present invention includes a wireless communications method implemented in a transmission point (TP) used in a wireless communications system. The wireless communications method comprises transmitting, to another TP, channel state information (CSI) for a user equipment (UE), and transmitting, to said another TP, user identification for the user equipment, wherein the signaling of the CSI for the user equipment enables user identification for the user equipment.

Still another aspect of the present invention includes a transmission point (TP) used in a wireless communications system. The TP comprises a receiver to receive, from another TP, channel state information (CSI) for a user equipment (UE) and user identification for the user equipment, wherein the signaling of the CSI for the user equipment enables user identification for the user equipment.

Still another aspect of the present invention includes a transmission point (TP) used in a wireless communications system. The TP comprises a transmitter to transmit, to another TP, channel state information (CSI) for a user equipment (UE) and user identification for the user equipment, wherein the signaling of the CSI for the user equipment enables user identification for the user equipment.

Still another aspect of the present invention includes a wireless communications method implemented in a wireless communications system. The wireless communications method comprises transmitting, from a transmission point (TP) to another TP, channel state information (CSI) for a user equipment (UE), and transmitting, from the transmission point (TP) to said another TP, user identification for the user equipment, wherein the signaling of the CSI for the user equipment enables user identification for the user equipment.

Still another aspect of the present invention includes a wireless communications system comprising a first transmission point (TP), and a second transmission point (TP) to transmit to the first TP, channel state information (CSI) for a user equipment (UE) and user identification for the user equipment, wherein the signaling of the CSI for the user equipment enables user identification for the user equipment.

DETAILED DESCRIPTION

Figure 1:
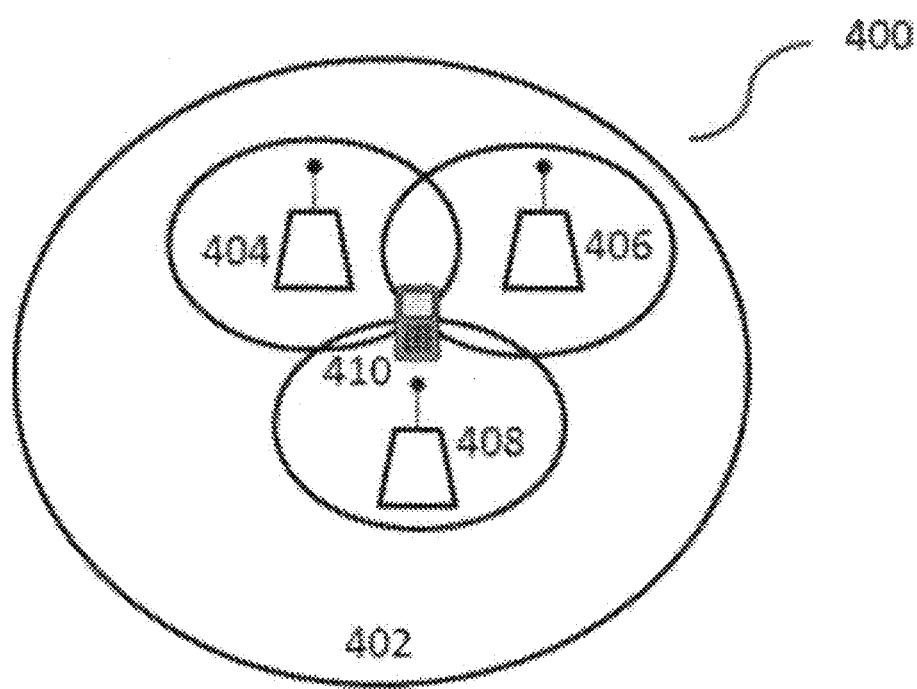
FIG. 1 depicts a block diagram of a CoMP system.

Referring now to FIG. 1, a CoMP mobile communications system 400 comprising a CoMP coordination zone or area or CoMP cooperating set 402 in which the embodiments may be implemented is illustrated. One or more user equipments 410 are served by one or more TPs or cells 404 to 408. TPs 404 to 408 can be base stations or eNBs. Each of the user equipments includes e.g. a transmitter and a receiver, and each of the base stations or eNBs 104 includes e.g. a transmitter and a receiver.

Embodiment A

We have captured the details of the scheduling framework in the appendix. We assume that for each user a measurement set containing up-to three TPs among those in the coordination zone is defined and held fixed for a time scale even coarser than the one at which the centralized decisions (precoder tuple or muting pattern assignment and possibly user association) are made.

From the description given in the appendix, we see that to determine the centralized decisions (such as the precoder tuple assignment and the user associations) under the full buffer traffic model, the designated central node (referred to here as the master TP (MTP)) should be able to obtain, $R_u^b(\hat{W})$, which we recall denotes an estimate of the average rate that user u can obtain (over the available time-frequency resource normalized to have size unity) when it is served data by TP b, given that the precoder tuple $\hat{W}$ is assigned to the TPs in the zone and that no other user is associated with TP b. Recall also that the precoder tuple $\hat{W}$ can also correspond to a muting pattern deciding which TPs should be active and which should be turned off in the time-frequency unit. For the joint semi-static point muting (SSPM) and semi-static point switching (SSPS) scheme (cf. (P1) in the appendix), this average estimate $R_u^b(\hat{W})$ must be obtained for each user u, each TP b in its measurement set and for all precoder tuple assignments. Note that for any precoder tuple, $R_u^b(\hat{W})$ can be considered to be negligible if the TP b is not in the measurement set of user u. Notice also that $R_u^b(\hat{W})$ can be assumed to be equal to $R_u^b(\hat{W}')$ for any two precoder tuple assignments $\hat{W}$ and $\hat{W}'$ which differ only in precoders assigned to TPs not in the measurement set of user u. For the SSPM problem (cf. (P2) in the appendix) with pre-determined user associations, the average estimate $R_u^b(\hat{W})$ must be obtained for each user u only for its pre-determined serving TP b, but the set of users associated to that TP must also be obtained. Thus, the following types of backhaul signaling are needed to facilitate a centralized implementation.

A1. Backhaul Signaling to Enable Determination of Centralized Actions (Such as Precoder Tuple/Muting Pattern Assignments and the User Associations)

We will now consider computation of the average rate estimates $\{R_u^b(\hat{W})\}$ at the MTP for some user u, under a precoder tuple assignment $\hat{W}$. These rates depend on the channels that the user sees from TPs in its measurement set. Using up-to three CSI processes (recall that the maximum measurement set size is three) which include a common interference measurement resource (IMR), the UE can report short-term CSI for each TP b in its measurement set, where this short-term CSI is computed based on the non-zero CSI-reference signal (RS) transmitted by TP b and the interference observed on the IMR, which in turn includes only the interference from TPs not in the measurement set of user u. The UE currently reports such CSI only to its designated anchor TP.

However, to fully exploit point switching gains we need to allow for the possibility of associating a user to a non-anchor TP and then allowing that user to report instantaneous (short-term) CSI to the non-anchor TP it has been associated to. Further, the CSI processes should be defined in a coordinated manner so that the users measure the appropriate interference on the constituent IMRs. Such coordinated configuration of IMRs also provides the ability to inject the desired interference (such as isotropically distributed interference) onto resource elements in those IMRs.

These short-term CSI can be sent to the MTP over the backhaul, which can then filter (i.e. perform a weighted average of) the received CSI sequence to obtain an averaged channel estimate $H_u^b$ for each TP b in the measurement set of user u. Alternatively, the averaging (or subsampling) of the short-term CSI can be done by the TP receiving the short-term CSI but where the averaging window (and possibly the weighting factors or subsampling factors) can be configured for that UE on a per CSI-process basis.

In either case, these averaged or subsampled channel estimates for all TPs in that UE's measurement set can be used by the MTP to compute $R_u^b(\hat{W})$ for each precoder tuple hypothesis $\hat{W}$ and if needed each TP b in its measurement set, under the assumption that the signal transmitted by each TP (along its assigned precoder under that hypothesis) is isotropically distributed. Another option is for the MTP to directly compute an estimate of the rate using each received short-term CSI and then average these computed rates to obtain an estimate of the average rate. We note that in case each precoder tuple hypothesis is a muting pattern, the average rate estimates can be computed using only the average received powers observed by each user from each TP in its measurement set. In such a case only reference signal received powers (RSRPs) need to be exchanged for a configurable set of users over the backhaul.

Moreover, the signaling of CSI (which can be RSRP) over the backhaul should enable the identification of the users whose CSI are being signaled as well as the attributes (such as zero-power CSI-RS or non-zero-power CSI-RS) of the corresponding CSI processes. Recall also that in the scenario with pre-determined users associations, the set of users associated to each TP in the zone needs to be exchanged or conveyed to the MTP.

These views are summarized in the following proposal.

Proposal: Signaling of averaged or subsampled CSI obtained over CSI processes corresponding to a configurable set of users should be considered. Coordination in configuring these CSI processes should be allowed.

Proposal: Possibility of configuring a user to report short-term CSI to more than one TP or a chosen TP in a configurable set of TPs should be considered.

Next, in the more general finite buffer model estimates of the queue sizes are needed to determine each coarse (centralized) action, where each such user queue size represents the amount of traffic that would available for transmission to serve that user until the next coarse action. Determining estimates of these queue sizes requires the TPs to report their most-recently updated associated user queue sizes before the next coarse action to the MTP.

Proposal: Signaling of associated user queue sizes by a TP to another TP should be considered, possibly by enhancing the status report.

A2. Backhaul Signaling from MTP to TPs

Each TP in the coordination zone is informed (semi-statically) about the precoder it should use and possibly the users it should serve on a time-frequency resource. The decision made by the MTP can be represented using a CoMP hypothesis. This can be achieved for instance, by assigning an identifier to each TP in the coordination zone and then including pairs representing (TP identifier, corresponding part of decision) in the CoMP hypothesis. Each TP then implements its own per-subframe scheduling based on the instantaneous CSI it receives from the users associated to it. Some comments on the set $\Psi$ which contains the set of precoders that can be assigned to each TP, are on order. We recall that this set includes codeword 0 to subsume muting as a special case. It can also include codewords of the form $\alpha I$ where $\alpha$ denotes a positive power level. In addition, it can include sector beams as its codewords. Notice that so far we have implicitly assumed that each TP will accept the decision made by the MTP. This assumption need not always hold, in which case it is beneficial (even necessary) to have an acknowledgement from the receiving TP conveying whether or not it accepts to implement its part of the decision in the CoMP hypothesis.

Note that since the decision represented by the CoMP Hypothesis should be valid for a period longer than the (maximum) backhaul delay. Henceforth we will refer to the time period over which a CoMP hypothesis is supposed to be valid (or supposed to apply) as a frame. Thus, the CoMP hypothesis should be signaled at a time granularity (i.e., the time interval between successive CoMP hypotheses) that is a multiple of the largest backhaul delay. Note that it in some scenarios it may be preferable for the MTP to receive the acknowledgement, in which case the multiple should be at-least 2. A small value of this multiple would help the system adapt faster, so we suggest a value for this multiple that is less than or equal to 3.

Proposal: Signaling of decisions made by one TP (such as precoder set or muting pattern assignment) to all other TPs over the backhaul should be considered. Such a decision can be represented by a CoMP Hypothesis. Signaling of an acknowledgement conveying a yes/no response to a received CoMP hypothesis should be considered.

A3. Distributed Implementation

In order to enable a de-centralized or distributed operation, a benefit metric corresponding to each CoMP hypothesis can be defined. In [1] a distributed implementation of power control is provided. An example distributed operation considering binary power control is described next and we note that extension to multiple power levels can be developed following the same approach. Each TP b in the coordination set can determine its set of interfering TPs, where a TP is labelled interfering for TP b if it is in the measurement set of at-least one user associated to TP b. Note that TP b can determine its set of interfering TPs. Further, let us refer to all TPs in whose interfering sets TP b is present as the out neighbor set of TP b. Each CoMP hypothesis can be defined such that the sending TP, say TP b, suggests a muting (or in general a power level) pattern for a set of time-frequency resources to a receiving TP, say TP a, in its interfering set of TPs. The benefit metric for that hypothesis comprises of a set gain (or loss, i.e., the gain can be negative) values (one for each time-frequency resource), where each gain represents the incremental average throughput or utility that would be achieved for the sending node (TP b) if the receiving node (TP a) accepts the suggested muting or power level (henceforth termed suggested action) on that time-frequency resource, while the other TPs in the interfering set of TP b as well as TP b do not alter their current status (current power level). TP a can then consider each time-frequency resource and add up all the gain values it has received for each suggested action on that resource. To this sum it can then add the gain (or loss) that it would obtain upon following the suggested action, assuming that all TPs in its interfering set do not alter their current status. This sum gain for each action can then represent the system utility gain that can be achieved by a one-step change, i.e., the incremental throughput or utility gain for the coordination set achieved when TP a accepts that suggested action on that resource and all the other TPs in the coordination set keep their current respective status. TP a can then independently choose its action on each time-frequency resource using a probabilistic rule [1], and this distributed operation can be shown to converge. Further, the TP a can signal its choice of actions using an enhanced RNTP. Note here that as an alternative the CoMP hypothesis can consider only one time-frequency resource and suggest multiple actions, one for each TP in its interfering set and the corresponding benefit metric can include a gain (or a loss) for each suggested action. In general, the CoMP hypothesis can include multiple tuples, where each tuple contains a TP identifier and a suggested action identifier, and one time-frequency resource identifier that is common for all tuples in that hypothesis. Alternatively, each tuple can include a time-frequency resource identifier and a suggested action identifier while the hypothesis includes a TP identifier that is common across all its constituent tuples. Combinations of these two general alternatives can also be used to define a CoMP hypothesis. In each case the benefit metric includes a gain (or loss) for each suggested action and a TP receiving the benefit metric must be able to determine which gain corresponds to which suggested action.

We next discuss efficient signaling mechanisms. First note that in order to reduce the signaling overhead, the network can configure to allow only a subset of TPs in the coordination set to make a change. This can be done in a de-centralized manner using a pre-determined function (known to all TPs in the coordination set), where this function returns the indices (or identifiers) of all TPs that are permitted to make a change, given the frame or sub-frame index as input. Alternatively, a designated TP can convey the set of TPs that are permitted to make a change, to all the other TPs in the coordination set, at the start of each frame. In either case, a TP b will send one or more CoMP hypothesis for TP a and corresponding benefit metrics, only if TP a is in its interfering set and TP a is in the set of TPs that are permitted to make a change on that frame. Further, the cardinality of the aforementioned set of TPs can be used to control the backhaul signaling overhead, as well as the size of the enhanced relative narrowband TX power (RNTP) which is used by each TP in that set to convey its actions to the other TPs. Note that each TP which changes its action on a time-frequency resource must report its changed action only to TPs in its out neighbor set.

Note that the distributed procedure described above can be implemented independently on each time-frequency resource. Then, the set of time frequency resources on which TPs can change their actions in a frame can also be controlled to reduce the signaling overhead. This can be accomplished as before, for instance by defining a rule using the frame index (known to all TPs in the coordination set) to decide the set of time-frequency resources at the start of each frame. A combination is also possible where in each frame a set of TPs which are permitted to change their actions and a set of time-frequency resources on which those TPs can change their actions is identified for each frame.

The configuration (or identification) of these sets can instead be done at a time-scale coarser than the frame duration, i.e. once in every n frames, where n is configurable. We have assumed that the set of TPs permitted to change their actions is the same across all time-frequency resources in the set of such resources. A more general approach would be to configure a separate set of TPs for each time-frequency resource. Here a designated node can optionally be used convey the configured sets to all other TPs.

However, a potential drawback with the distributed approach described above is if the benefit metrics do not allow a TP to infer (a good approximation of) the system utility gain (or loss) accrued by a suggested action on a time-frequency resource, in which case oscillatory behavior or convergence to a highly sub-optimal operating point can result. We summarize our views in the following proposal.

Proposal: The benefit metrics received by a TP should enable it to compute a system utility change for each action suggested for that TP in each of its received CoMP hypothesis.

Thus, we provided our views on backhaul signaling needed for CoMP-NIB comprising of the following proposals:

Proposal: Signaling of averaged or subsampled CSI obtained over CSI processes corresponding to a configurable set of users should be considered. Coordination in configuring these CSI processes should be allowed.

Proposal: Possibility of configuring a user to report short-term CSI to more than one TP or a chosen TP in a configurable set of TPs should be considered.

Proposal: Signaling of associated user queue sizes by a TP to another TP should be considered, possibly by enhancing the status report.

Proposal: Signaling of decisions made by one TP (such as precoder set or muting pattern assignment) to all other TPs over the backhaul should be considered. Such a decision can be represented by a CoMP Hypothesis. Signaling of an acknowledgement conveying a yes/no response to a received CoMP hypothesis should be considered.

Proposal: The benefit metrics received by a TP should enable it to compute a system utility change for each action suggested for that TP in each of its received CoMP hypothesis.

Embodiment B

We present our views on the signalling that is appropriate to extract network assisted interference cancellation and suppression (NAICS) gain.

We assume that a candidate list of potentially interfering cells is configured by the network for the user of interest. For each cell in this list (identified by an index, a natural choice of which is the corresponding cell ID) the network can specify a set of parameters. Such a candidate list (along with its constituent parameters) should be semi-statically configured by the network for the user in order to simplify and assist the user's blind detection.

B1. Signaling Parameters Pertaining to Reference Signal (RS)

B1.1 Signaling Parameters Associated with the Cell-specific Reference Signal (CRS)

We first consider the signalling needed to convey parameters associated with the CRS transmitted by each cell in the candidate list. In our view, the number of CRS ports for each cell in the list (and optionally its corresponding frequency shift or the multimedia broadcast multicast service (MBMS)

or single frequency network (MBSFN) sub-frame configuration) is quite beneficial in reducing the blind detection complexity at the user of interest. In this context, we note that the possibility of CRS not being transmitted at-all by the interferer might also need to be considered by the user over any sub-frame in order to incorporate dynamic cell ON-OFF. Another useful parameter is the (expected) physical downlink shared channel (PDSCH) start symbol. The signalling of this parameter conveys the actual (or likely) starting symbol of the interfering PDSCH and is needed to fully exploit NAICS gain (over all transmitted interfering PDSCH symbols). Moreover, blind detection of the starting symbol by the user appears to be quite challenging.

B1.2 Signaling CSI-RS Related Parameters

Next, we consider configuration parameters associated with the CSI-RS (including both zero-power and non-zero power CSI-RS). In this case, the user upon knowing one or more CSI-RS configurations that can be employed by each potential interferer in its list, knows the PDSCH resource element (RE) mappings possible under each such interferer hypothesis, which clearly will improve interference cancellation/suppression gains (for a given feasible level of complexity).

On the other hand, signalling for quasi co-location (QCL) indication needs further evaluation since purely demodulation reference signal (DMRS) based channel estimation was sufficient for desired signal demodulation in several evaluated instances during 3GPP Release 11 and it is unclear if enhanced estimation of the channel seen from an interferer is really needed for cancellation/suppression gains.

In summary, we have the following proposal for the parameters pertaining to the RS.

Proposal: Convey via semi-static signaling about each cell in a candidate list:

(1) Number of CRS ports and PDSCH start symbol
(2) CSI-RS configuration(s)

B2. Signalling to Aid Blind Detection of Other Dynamic Parameters

B2.1 Modulation Classification

We note that the joint blind detection of modulation, PMI, RI and presence of one dominant interferer using a CRS based TM (transmission mode) has been deemed feasible for 2 CRS ports, at-least under the simulated scenarios and provided that the other required parameters are perfectly known. Similarly, in the case of DMRS based TM, joint blind detection of modulation, nSCID and presence of one dominant interferer using up-to two DMRS ports (ports 7 and 8) has been deemed feasible, again under the simulated scenarios and provided that the other required parameters are perfectly known.

However, the evaluation so far has assumed only the three modulation types that can be employed up-to 3GPP Release 11, i.e., quadrature phase shift keying (QPSK), 16 quadrature amplitude modulation (QAM) and 64 QAM. It is likely (or imminent) that a higher modulation order (256 QAM) will be agreed in 3GPP Release 12. This then raises the question about feasibility of blind detection in scenarios where 256 QAM can be employed by the interferer. In this context, we note that applying blind modulation classification when multiple higher order modulation types can be employed by the interferer is more complicated (indeed the classification errors tend to be increasing with the modulation order). Moreover, NAICS gain (even after correctly classifying an interferer employing a higher order modulation) over the baseline interference rejection combining (IRC) receiver will be smaller, since the IRC receiver regards interference as a (un-constrained) Gaussian variable, an assumption that becomes increasingly suitable for denser QAM constellations. To summarize, support of 256 QAM with NAICS needs to be further evaluated. Our preference is thus the following.

Proposal: Blind modulation classification is done by the user assuming that QPSK, 16 QAM and 64 QAM are the modulation types that can be employed by any interferer.

It is desirable that the assumption made by the user is indeed respected by each interferer in its candidate list, i.e., it is desirable that the network enable NAICS functionality only in the regime where 256 QAM is not employed in a cluster of cells. In case, this is not true, the user can itself disable its NAICS capability and fallback to IRC based reception, following some decision rule, when it perceives degraded performance due to operation in a scenario where 256 QAM is often employed by one or more interferers.

B2.2 Supporting 4TX

The support for 4TX is important and NAICS gain should hold for such deployments. Let us consider the case where the dominant 4TX interferer employs a CRS-based TM. Here, blind detection of the assigned transmit rank of the interferer among all the four possible transmit ranks can result in an excessive complexity expended to chase gains that become increasingly marginal for larger ranks. It is thus meaningful to restrict the transmit rank assigned by the interferer. The user can be informed via semi-static signaling about an upper bound to the transmit rank that can be assigned by each potentially interfering cell in its candidate list. Alternatively, the semi-static signaling can indicate an expected transmit rank that is likely to assigned by that interferer, which can be used as a more probable seed value for the blind detection implementations.

Next, we suppose a dominant interferer (from the candidate list) employing a DMRS based TM. In this case, physical resource block (PRB)-pair has been agreed as the minimum resolution of the time-frequency unit that can be assigned by any such interferer.

Here, it is particularly beneficial if the user has to consider only ports 7 and 8 in order to detect the presence and absence of interferer and classify the rank on each PRB-pair, possibly by determining the norms of the columns of the corresponding equivalent channel estimate. Recall that joint blind detection has been deemed feasible only with such a qualification. Consequently, semi-static signaling a transmit rank upper bound adhered to by each potential interferer is useful here as well.

Proposal: Convey via semi-static signaling about each cell in a candidate list:

An upper bound on the transmit rank that can be assigned.

B3. Other Issues

We believe that synchronization should be assumed by the user without any explicit signaling since this is in any case the main operating regime where NAICS gain can be achieved in a feasible manner. While, the user can itself disable its NAICS capability and fallback to IRC based reception, following some decision rule, when it perceives degraded performance due to operation in an asynchronous scenario, it is desirable that the network enable NAICS functionality only in the synchronous regime.

The user can perform blind detection (classification) after assuming a certain minimum time-frequency unit that can be assigned by an interferer under each transmission scheme, in other words, after assuming that the parameters that it seeks to classify remain constant within that unit. This minimum assignable time-frequency unit can be set or assumed, for instance, to be one PRB-pair. This is a choice that is indeed accurate at-least for DMRS based TMs and has been found to ensure reliable blind detection. One PRB-pair for all DMRS based TMs has been found sufficient to ensure reliable blind detection. For CRS based TMs the minimum assumed unit can be configured (by the network for the user) to be either a slot or a PRB pair. It is beneficial with respect to NAICS gain that this assumption is indeed respected by each interferer in the list, i.e., it is desirable that the network enable NAICS functionality only in the regime where the respective assumed minimum assignable time-frequency units are followed by all the cells. Then, note that configuring the minimum assumed unit for CRS based TMs to be a slot makes blind detection challenging but does not preclude distributed virtual resource block (DVRB) based allocation, while configuring the minimum assumed unit to be a PRB-pair makes blind detection more feasible but precludes DVRB based allocation. While these assumed minimum assignable time-frequency units can be made further configurable on a per-interferer basis for each user, i.e., the assumed minimum assignable time-frequency units can be altered semi-statically for each cell in that user's candidate list of interferers, further evaluation is needed to assess if this is beneficial. This is because such semi-static configuration in the absence of any explicit scheduling restrictions will not lead to significant NAICS gain, while placing scheduling restrictions can be counter-productive due to the bursty nature of the traffic. In this context, we note that a significant portion of the traffic is expected to be bursty and formed by very small per-user data demands.

Proposal: Interference cancellation/suppression is attempted by the user assuming synchronization and a minimum time-frequency unit that can be assigned by a dominant interferer for each transmission scheme.

We note that in case the assumed minimum assigned unit is configured to be a slot for the CRS based TMs, it is still possible to exploit for blind detection the fact that the minimum unit can be more than a slot (i.e., can be a PRB-pair) even under CRS based TMs when the resource allocation is not DVRB based.

Finally, for each cell in the candidate list of the user, a possible set of transmission schemes that could be utilized by that cell, should be specified. This will obviously reduce the blind detection complexity at the user end and will also enable the network to configure the best possible scenario for NAICS (if deemed beneficial by the network), where the users sees the same transmission scheme (such as a DMRS based scheme) being used by both the serving cell and the interferer.

B4. Benefit Metric in Coordinated Multi-point Transmission and Reception with Non-Ideal Backhaul (CoMP-NIB)

Figure 2:
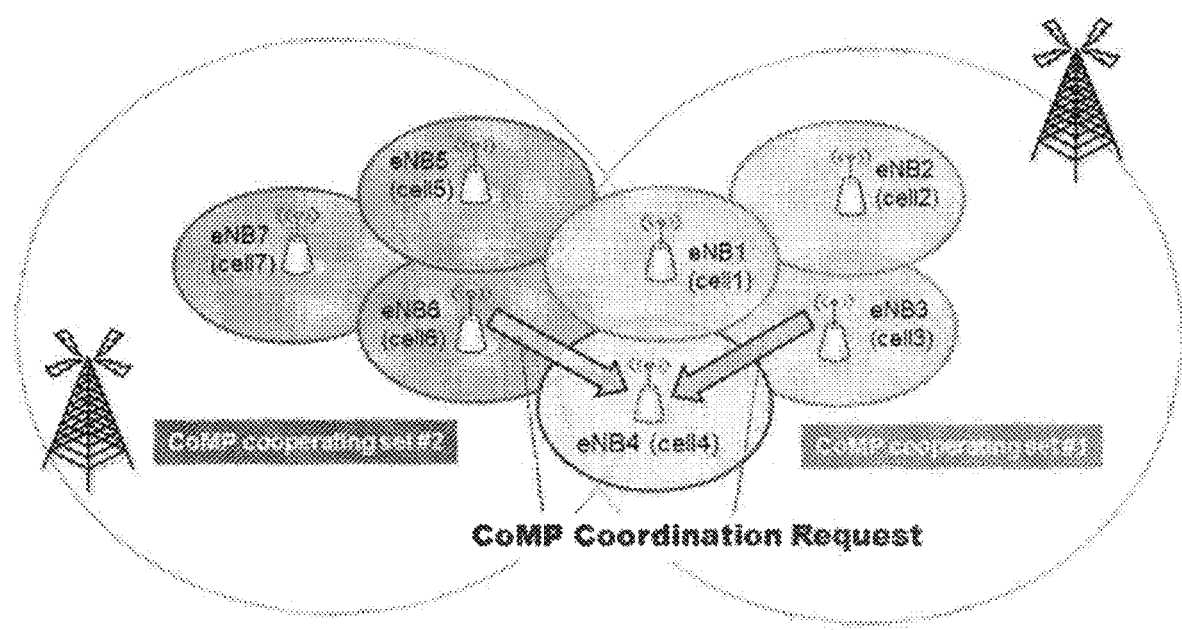
FIG. 2 depicts a CoMP coordination request under CoMP-NIB implementation.

With reference to FIG. 2, in order to allow CoMP-NIB implementation, CoMP coordination request including (but not limited to) the followings can be sent from one eNB to another:

One or more CoMP hypotheses, each comprising a hypothetical resource allocation associated with a cell ID, where the cell identified by the cell ID is not necessarily controlled by the receiving eNB, A benefit metric associated with one or more CoMP hypothesis/es, quantifying the benefit that a cell of the sender node expects in its scheduling when the associated CoMP hypothesis/es is assumed, and Necessary time/frequency granularity and signaling period: Same as the associated CoMP hypothesis/es.

Consider the benefit metric associated with one CoMP hypothesis and suppose that the cell ID in that hypothesis identifies a cell controlled by the receiving eNB. The intention of benefit metric is to help the receiving eNB gauge the benefit that will be accrued by the sending eNB, if it follows the suggestion in the associated CoMP hypothesis. The receiving eNB can weigh this benefit against the loss it might accrue upon following that suggestion, and then decide its response. However, implicit in the derivation of this cell-specific benefit metric is the use of a reference state that the sending eNB assumes for the receiving eNB (or equivalently for the cell identified by the ID) over the time-frequency resource indicated in the CoMP hypothesis. For instance, if the CoMP hypothesis suggests "muting" (or zero power-level) over a time-frequency resource, the sending eNB could have computed the benefit metric after assuming a reference state of non-muting (i.e., a certain non-zero power level) for the receiving eNB over the same indicated time-frequency resource. In the multi-vendor scenario and particularly in the case when multiple power levels (not just binary) can be indicated via a CoMP hypothesis, it is desirable that the reference state used to by each sending eNB in deriving its benefit metric be known to the receiving eNB, so that the latter can properly decide its response. This can be done without explicit signaling if it is agreed that the benefit metric is computed by each sending eNB using a pre-defined reference state. This pre-defined reference state can for instance be the highest power level that can be used over a time-frequency resource or it can be the current power level being used by the receiving eNB over the time-frequency resource.

Next, let us consider a common benefit metric associated with multiple CoMP hypotheses.

Here, again the aforementioned reference state can be assumed for all cells indicated via their IDs in the multiple hypotheses. The use of benefit metric is better justified when it is associated to one hypothesis rather than multiple hypotheses, since in the latter case it is not possible to determine which individual hypothesis contributes what fraction of that overall common benefit metric. Consequently, for a given number of bits available to convey the benefit metric, the range of the benefit metric must be optimized for the case when it is used for an individual hypothesis rather than multiple hypotheses. Further, as an alternative, a scaling factor for the benefit metric should be separately configurable (on a per-eNB basis if needed). Then, the receiving eNB can scale the received benefit metric by the scaling factor associated with the sending eNB (which could be common for all eNBs or as an option could be configured separately for each sending eNB) to decide its response. Another alternative would be for each eNB to obtain a time average of the benefit metrics sent by a sending eNB and then determine the scaling factor for that sending eNB using that average.

Embodiment C

In 3GPP RAN3 Meeting #84, the following agreements on X2 messages to support the inter-eNB CoMP were reached [3]:

"The task of inter-eNB CoMP is to coordinate multiple eNBs in order that the coverage of high data rates and the cell-edge throughput are improved, and also the system throughput is increased. The coordination of multiple eNBs is achieved by signalling between eNBs of hypothetical resource allocation information, CoMP hypotheses, associated with benefit metrics. Each of the signalled CoMP hypotheses is concerned with a cell belonging to either the receiving eNB, the sending eNB or their neighbour. The benefit metric associated with the CoMP hypotheses quantifies the benefit assuming that the CoMP hypotheses are applied. The receiving eNB of the CoMP hypotheses and the benefit metrics may take them into account for RRM and may trigger further signalling FFS.

RSRP measurement reports can also be exploited for inter-eNB CoMP. For example, the RSRP measurement reports can be used to determine and/or validate CoMP hypotheses and benefit metrics. [Further explanation on the RSRP measurement reports of UEs: FFS] Inter-eNB CoMP is located in the eNB."

In the following, we provide our views along with the required message structure.

C1.1 CoMP Hypothesis for Inter-eNB CoMP

Figure 3A:
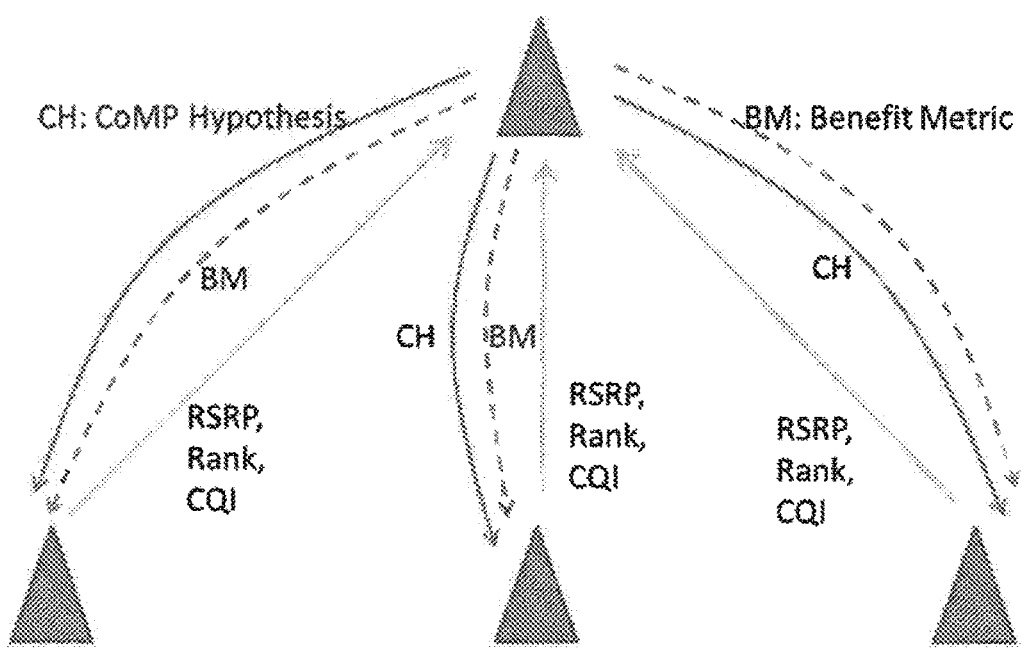
FIG. 3(a) depicts an example of centralized CoMP coordination via CoMP hypothesis and Benefit metric over X2.
Figure 3B:
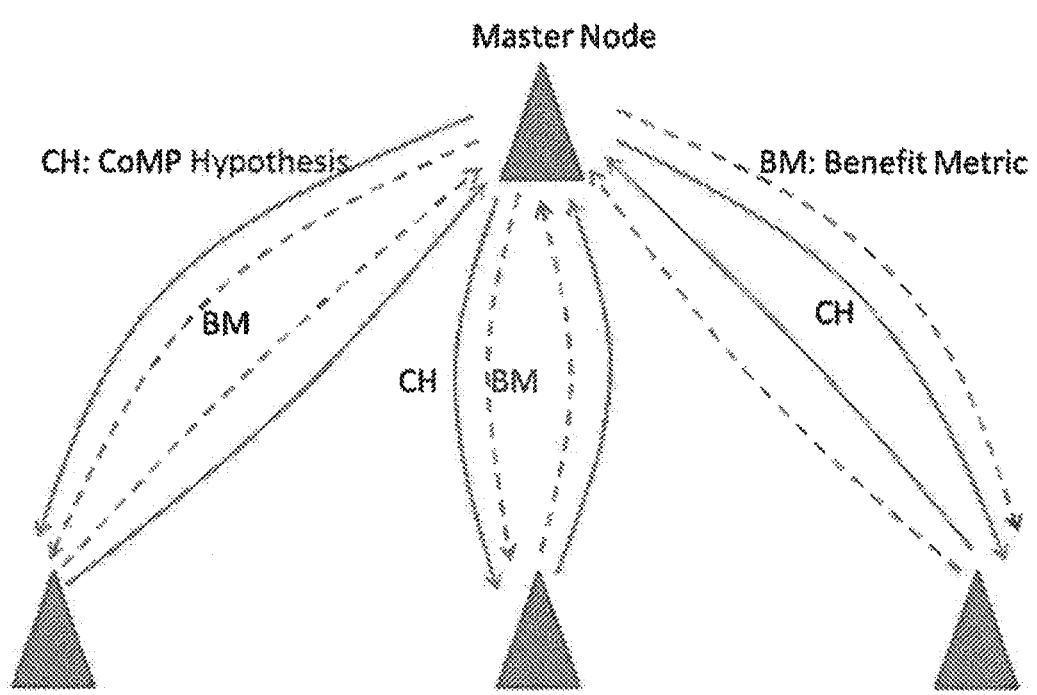
FIG. 3(b) depicts an example of centralized CoMP coordination via CoMP hypothesis and Benefit metric over X2. Note here that the BM is used to convey the utility change for a particular resource allocation indicated in the associated CH to the Master node. The CH sent by the Master node contains the resource allocation decision.
Figure 4:
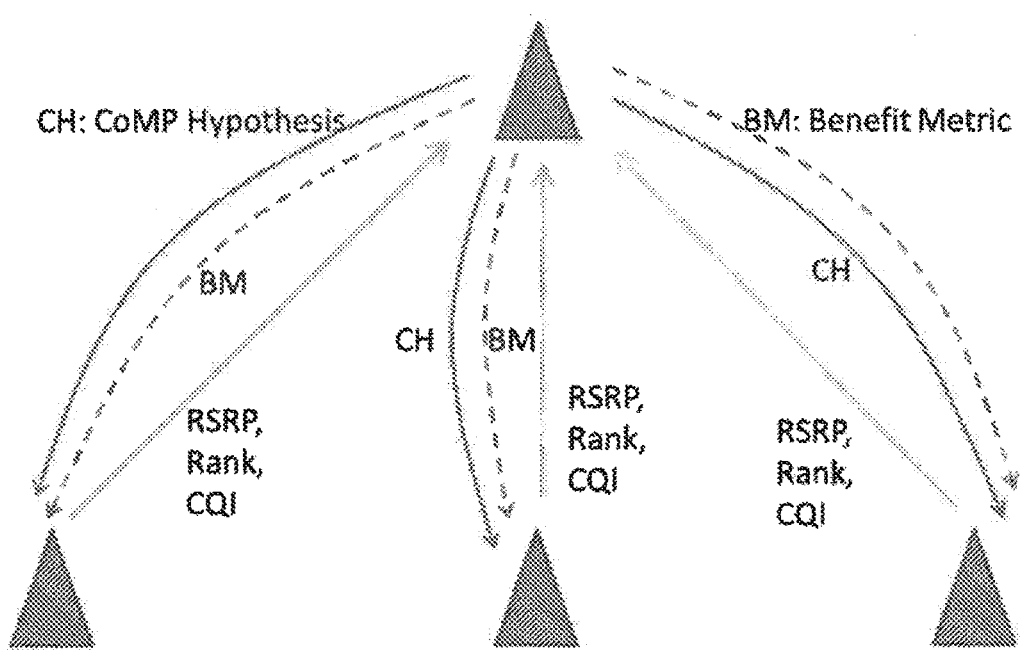
FIG. 4 depicts an example of distributed CoMP coordination via CoMP hypothesis and Benefit metric over X2.

Each CoMP hypothesis (CH) contains a hypothetical resource allocation for a cell that is not necessarily controlled by the receiving eNB. The design of signaling associated with such CoMP hypotheses must facilitate both centralized and distributed radio resource management (RRM). In centralized RRM a potential use of CH would be a mandatory resource allocation that the cell indicated in that CH will (or must) follow, whereas in a distributed RRM scenario the CH would be a request which the indicated cell may or may not follow. As a result, including an element in the CH to indicate whether the constituent resource allocation is mandatory or not, is desirable. This element is also useful when the CH is sent to the eNB not controlling the indicated cell, since then the latter eNB can have more information about the possible resource allocation of neighboring cells, to make its own resource allocation decision. We note that when the CH is used to convey a mandatory resource allocation (or a final decision of centralized RRM) there is limited use of the associated benefit metric. Thus, one approach of realizing the element would be via a special value of the benefit metric. In particular, when the associated benefit metric is null or set to that special value then the resource allocation in the CH is mandatory, otherwise, the resource allocation is not mandatory. An example of centralized coordination is given in FIGS. 3(a) and 3(b), and that of a distributed coordination is given in FIG. 4. Note that in the distributed case, eRNTP can be used to convey the resource allocation decisions.

Proposal C1: Include an element in CoMP hypothesis message to indicate whether the included resource allocation for the indicated cell is mandatory or not.

Another relevant point here is that a cell needs to be indicated in the CH using an ID. This ID should be unique for each cell. This requirement rules out using the physical cell ID, since in certain deployments multiple neighboring cells (or transmission points) can share the same physical cell ID. It is nevertheless important to be able to specify or signal a CH for a particular cell among a set of cells sharing the same physical cell ID.

C1.2 Benefit Metric

Figure 5:
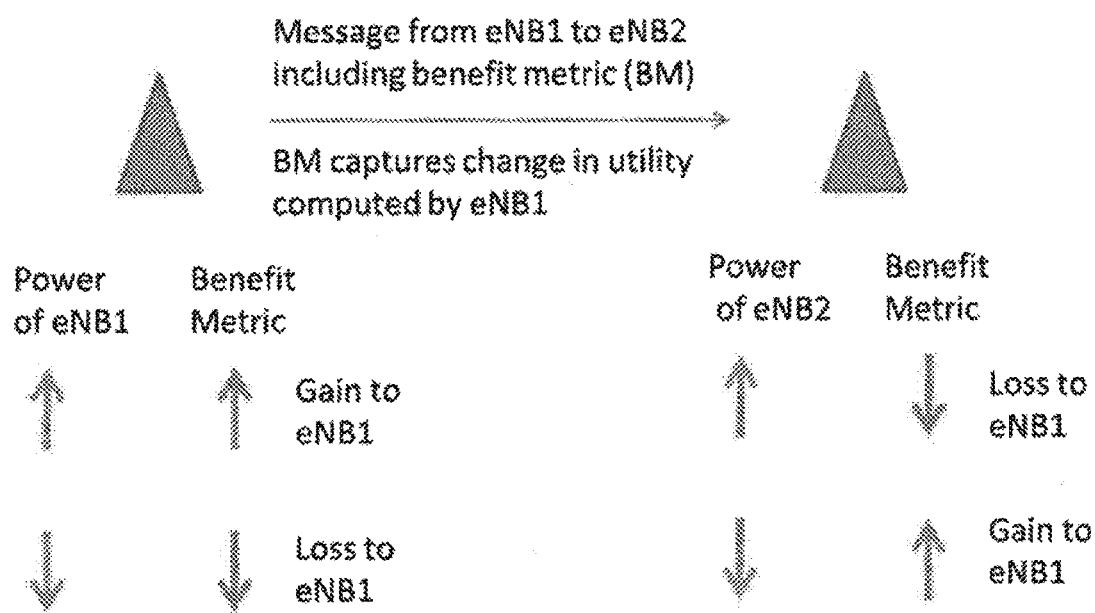
FIG. 5 depicts that if only "gains" can be conveyed via benefit metric, eNB2 may not obtain the information about the loss it can cause to eNB1 by increasing its power. Consequently, such an increase in power would have to be done unilaterally by eNB2 which is undesirable.

We first consider the role of benefit metric in a distributed setup. In such a case the cell indicated in the associated CoMP hypothesis will typically be controlled by the receiving eNB. Then, the intention of benefit metric (as stated in RAN1 proposals such as [4]) is to help the receiving eNB gauge the benefit that will be accrued by the sending eNB, if it follows the suggested resource allocation in the associated CoMP hypothesis. The receiving eNB can then add up all the metrics it receives for a particular cell controlled by it and a particular resource allocation, and compare the sum against the gain or loss it might incur, in order to decide the resource allocation for its cell. For the receiving eNB to make a decision that will lead toward a social optima, it should have information about the loss it can cause to other eNBs by certain allocation (such as power boosting on some PRB that was muted previously in response to a request). This point is illustrated in FIG. 5. Moreover, in the case the cell identified by the sending eNB is controlled by the sender, a negative value can be used to convey the loss the sending eNB can incur by muting a certain resource. For instance, we note that the sign of the benefit metric value can be separately conveyed via a separate binary valued element in the benefit metric field, which is one if the metric is positive and is zero otherwise, or vice versa.

Proposal C2: Allow negative values in the benefit metric.

The guiding principle behind benefit metric was that it could be used to convey the change in a utility function in a succinct manner. The utility function usually depends on several factors such as queue sizes, channel states, priorities (or quality of service (QoS) classes) of the users being served by that eNB or cell. The benefit metric has the potential to convey the change resulting from a hypothetical resource allocation, without the need of signaling all the constituent terms of the utility function. However, this potential can be realized only if the benefit metric field is large enough. Moreover, a potentially serious drawback of not having a benefit metric field that allows for a fine quantization of the utility change is that it can lead to oscillatory behavior in distributed coordination. An additional use of a larger benefit metric field is that it provides the operator the flexibility to simultaneously convey different utility changes for the same hypothetical resource allocation (or set of resource allocations in the CoMP hypothesis set associated with that benefit metric), where each such change can be computed by emphasizing different terms of the utility function.

Proposal C3: The benefit metric field should be sufficiently large, e.g., 3 bytes or 2 bytes.

It has been agreed that a single benefit metric can be associated with multiple CoMP hypotheses, i.e., a CoMP hypothesis set. Consider such a scenario where one benefit metric is associated with L hypotheses in a CoMP hypothesis set. In such a case, where L>1, it will be helpful if the benefit metric field represents a string of L+1 numbers. This will enable differential encoding of benefit metric. For instance, the first number could be the base value (quantized by a certain number of bits, where that number is less than the benefit metric field size which is for instance 3 bytes or 24 bits) which represents the utility change when all the resource allocations are together applied. On the other hand, each of the other L numbers can be offsets (represented by $\Delta$ bits each) computed with respect to the base value, such that the sum of the base value and the offset captures the utility change when only the corresponding individual resource allocation is applied. It is well established that differential encoding allows for finer quantization for a given payload size. Note that L and $\Delta$ can be separately conveyed and are configurable, for instance L can be conveyed in the range of the CoMP hypothesis set. So L=1 or $\Delta$=0 would mean that the benefit metric reduces to a single number that is common for all the associated hypothesis or hypotheses. An alternative benefit of this differential encoding feature is that it provides the operator the flexibility to convey different utility changes for the same hypothetical resource allocation, where each such change can be computed by emphasizing different terms of the utility function. Note that the value of L can vary between 1 and a maximum, denoted by maxnoofCoMPCells. Example values for maxnoofCoMPCells are 4, 8, 16, or 256. We note here that a larger value of maxnoofCoMPCells can help to reduce overhead (since a single benefit metric field is associated with all the hypotheses in the set) and is useful if the CoMP hypothesis set is being used to convey the final decision in a centralized RRM, since in that case the associated single benefit metric value can be set to a special value (or null) to indicate that the hypothesis set is mandatory.

Proposal C4: Differential encoding of the benefit metric field should be supported.

We discussed the necessary X2 message to support the inter-eNB CoMP.

C2. Text Proposal
9.2.xx CoMP Information
This Information element (IE) provides the list of CoMP hypothesis sets, where each CoMP hypothesis set is the collection of CoMP hypothesis(es) of one or multiple cells and each CoMP hypothesis set is associated with a benefit metric.

Example-1a

| IE/Group Name | Presence | Range | IE type and reference | Semantics description |
|---|---|---|---|---|
| CoMP Information Item | | 1 . . . <maxnoofCoMPInformation> | | |
| >CoMP Hypothesis Set | M | | 9.2.xy | |
| >Benefit Metric | M | | BIT STRING (SIZE (24)) | The first left most bit: value "1" means positive benefit and value "0" means negative benefit. The remaining bits quantize the magnitude of benefit. All bits with value "0" represent the special value that denotes CoMP Hypothesis Set IE is mandated indication by the sending eNB. |
| [>Time Granularity: FFS] [Starting SFN: FFS] [Starting Subframe Index: FFS] | | | | |

| Range bound | Explanation |
|---|---|
| maxnoofCoMPInformation | Maximum number of CoMP Hypothesis sets. The value is FFS. |

Example-1b

| IE/Group Name | Presence | Range | IE type and reference | Semantics description |
|---|---|---|---|---|
| CoMP Information Item | | 1 . . . <maxnoofCoMPInformation> | | |
| >CoMP Hypothesis Set | M | | 9.2.xy | |
| >Benefit Metric | M | | BIT STRING (SIZE (24)) | The first left most bit: value "0" means positive benefit and value "1" means negative benefit. The remaining bits quantize the magnitude of benefit. All bits with value "0" represent the special value that denotes CoMP Hypothesis Set IE is mandated indication by the sending eNB. |
| [>Time Granularity: FFS] [Starting SFN: FFS] [Starting Subframe Index: FFS] | | | | |

| Range bound | Explanation |
|---|---|
| maxnoofCoMPInformation | Maximum number of CoMP Hypothesis sets. The value is FFS. |

Example-2a

| IE/Group Name | Presence | Range | IE type and reference | Semantics description |
|---|---|---|---|---|
| CoMP Information Item | | 1 . . . <maxnoofCoMPInformation> | | |
| >CoMP Hypothesis Set | M | | 9.2.xy | |
| >Benefit Metric | M | | BIT STRING (SIZE (16)) | The first left most bit: value "1" means positive benefit and value "0" means negative benefit. The remaining bits quantize the magnitude of benefit. All bits with value "0" represent the special value that denotes CoMP Hypothesis Set IE is mandated indication by the sending eNB. |
| [>Time Granularity: FFS] [Starting SFN: FFS] [Starting Subframe Index: FFS] | | | | |

| Range bound | Explanation |
|---|---|
| maxnoofCoMPInformation | Maximum number of CoMP Hypothesis sets. The value is FFS. |

Example-2b

| IE/Group Name | Presence | Range | IE type and reference | Semantics description |
|---|---|---|---|---|
| CoMP Information Item | | 1 . . . <maxnoofCoMPInformation> | | |
| >CoMP Hypothesis Set | M | | 9.2.xy | |
| >Benefit Metric | M | | BIT STRING (SIZE (16)) | The first left most bit: value "0" means positive benefit and value "1" means negative benefit. The remaining bits quantize the magnitude of benefit. All bits with value "0" represent the special value that denotes CoMP Hypothesis Set IE is mandated indication by the sending eNB. |
| [>Time Granularity: FFS] [Starting SFN: FFS] [Starting Subframe Index: FFS] | | | | |

| Range bound | Explanation |
|---|---|
| maxnoofCoMPInformation | Maximum number of CoMP Hypothesis sets. The value is FFS. |

Example sizes for maxnoofCoMPInformation are 4, 8, 16, or 256.

Embodiment D

In the following we provide our views on X2 messages to support the inter-eNB CoMP along with the required message structure.

D1. CoMP Hypothesis for Inter-eNB CoMP

Each CoMP hypothesis (CH) contains a hypothetical resource allocation for a cell that is not necessarily controlled by the receiving eNB. The design of signaling associated with such CoMP hypotheses and associated benefit metrics must facilitate both centralized and distributed RRM. The use cases in both centralized and distributed RRM is described in the appendix. Our preference for computing the benefit metric on a linear scale is justified there.

We next present our view on the coding structure of the CoMP hypothesis.

From the agreements made so far ([2] and [3]), it is clear that a benefit metric is associated with multiple CoMP hypotheses, where each CoMP hypothesis indicates a resource allocation in the frequency domain (on a per-RB basis) as well as the time domain (across multiple sub-frames). The guiding principle behind benefit metric was that it could be used to convey the change in a utility function in a succinct manner. The utility function usually depends on several factors such as queue sizes, channel states, priorities (or QoS classes) of the users being served by that eNB or cell. The benefit metric has the potential to convey the change resulting from a hypothetical resource allocation, without the need of signaling all the constituent terms of the utility function. However, this potential can be realized only if the benefit metric value represents a fine enough quantization. Moreover, a potentially serious drawback of not having a benefit metric field that allows for a fine quantization of the utility change is that it can lead to oscillatory behavior in distributed coordination.

It is apparent that the amount of information we can convey using a single benefit metric value (effective quantization level) becomes increasingly diminished as we include more hypotheses in the CoMP hypothesis set, as well as when we increase the choices (possibilities) of the resource allocation that can be conveyed by each hypothesis. Thus, the predominant use case would be to have a limited CoMP hypothesis set size (which is controllable with the maximum being 32) and have limited choices of resource allocation possibilities conveyed by each hypothesis.

This can be achieved by conveying resource allocation associated with each hypothesis across frequency (on a per-RB basis) and over one (or a few) sub-frames in the time domain (via a list). The pattern represented by the list is understood to be repeated continuously. Furthermore, it is sensible to restrict all patterns (corresponding to different hypotheses in the set) to have the same size in terms of the number of sub-frames spanned by them. Such a design permits all the flexibility needed by the typical use-cases and also achieves overhead reduction. We further note that patterns of unequal sizes also complicate the benefit metric computation. This design is described in our text proposal.

We discussed the necessary X2 message to support the inter-eNB CoMP and presented corresponding text proposals.

D2. Text Proposal 9.2.xx CoMP Information

This IE provides the list of CoMP hypothesis sets, where each CoMP hypothesis set is the collection of CoMP hypothesis(ses) of one or multiple cells and each CoMP hypothesis set is associated with a benefit metric.

| IE/Group Name | Presence | Range | IE type and reference | Semantics description |
|---|---|---|---|---|
| CoMP Information Item | | 1 ... <maxnoofCoMPInformation> | | |
| >CoMP Hypothesis Set | M | | 9.2.xy | |
| >CoMP Hypothesis List Size | M | 1 ... <maxnoofSubframes> | | The size (cardinality) of each CoMP Hypothesis list in the CoMP Hypothesis set. |
| >Benefit Metric | M | | INTEGER (−101 ... 100, ... ) | Value −100 indicates the maximum cost, and 100 indicates the maximum benefit. Value −101 indicates unknown benefit. The value is computed on a linear scale. |
| CoMP Information Start Time | | 0 ... 1 | | |
| >Start SFN | M | | INTEGER (0 ... 1023) | SFN of the radio frame containing the first subframe when the CoMP Information IE is valid. |
| >Start Subframe Number | M | | INTEGER (0 ... 9) | Subframe number, within the radio frame indicated by the Start SFN IE, of the first subframe when the CoMP Information IE is valid. |

| Range bound | Explanation |
| --- | --- |
| maxnoofCoMPInformation | Maximum number of CoMP Hypothesis sets. The value is 256. |
| maxnoofSubframes | Maximum number of Subframes. The value is 40. | maxnoofSubframes can alternatively be 20 or 80.

9.2.xy CoMP Hypothesis Set

This IE provides a set of CoMP hypotheses. A CoMP hypothesis is hypothetical PRB-specific resource allocation information for a cell.

| IE/Group Name | Presence | Range | IE type and reference | Semantics description |
| --- | --- | --- | --- | --- |
| CoMP Hypothesis Set Element | | 1 ... <maxnoof CoMPCells> | | |
| >Cell ID | M | | ECGI 9.2.14 | ID of the cell for which the CoMP Hypothesis IE is applied. |
| >CoMP Hypothesis List | M | CoMP Hypothesis List Size | | The CoMP Hypothesis List IE is repeatedly applied. |
| >>CoMP Hypothesis | M | | BIT STRING (6 ... 110, ... ) | Each position in the bitmap represents a PRB (i.e. first bit = PRB 0 and so on), for which value "1" indicates interference protected resource and value "0" indicates resource with no utilization constraints. |

D3. Use of Special Value

In centralized RRM a typical use of CoMP hypothesis (CH) set would be a mandatory resource allocation that each cell indicated in the respective CH will (or must) follow, whereas in a distributed RRM scenario the CH would be a request which the indicated cell may or may not follow. As a result, using a special value of the associated benefit metric to indicate whether the constituent resource allocations are mandatory or not, is desirable. This is also useful when the CH is sent to the eNB not controlling the indicated cell, since then the latter eNB can have more information about the possible resource allocation of neighboring cells, to make its own resource allocation decision. An example of centralized coordination is given in FIG. 3(a), and that of a distributed coordination is given in FIG. 4. Note that in the distributed case, eRNTP can be used to convey the resource allocation decisions.

D4. Use of Benefit Metric

In the context of Section C1.2, we note that comparing different benefit metric values for a given (hypothetical) resource allocation is simplified if these values are computed using a linear scale. In that case we can simply add the values together (after scaling or shifting) to assess the net benefit (or cost). The scaling or shifting parameters (if needed) can be determined by each eNB based on previously received reports. The other option is for an entity (operator) to provide each eNB with a loop-up-table corresponding to each of its neighbors, which that eNB can use to first map each received benefit value to an estimated value using the appropriate look-up-table and then compare the estimated values. We slightly prefer the first option since the second one is more complex.

Appendix Optimizing Proportional Fairness Utility Metric

Suppose that there are K users and B transmission nodes or transmission points (TPs) in the CoMP cluster, i.e., coordination set or of interest, where these TPs can include multiple eNBs. For convenience in exposition, here we assume a full buffer traffic model and let $\Omega$ denote the set of K users. We consider hybrid schemes where the assignment of precoding matrices (beamforming vectors or sectored beams) to the B TPs and the association of users with those TPs (i.e., point switching) are done in a semi-static centralized manner based on average estimates of SINRs, rates etc. On the other hand, given its assigned precoder (or beam) and the users associated with it, each TP does per sub-frame scheduling independently based on the instantaneous short-term CSI.

Let $\hat{W}=(W_1, \ldots, W_B)$ denote an assignment of a precoder tuple, where $W_b$ is the precoder assigned to the $b^{th}$ TP. Here each precoder $W_b$ can be chosen from a pre-determined finite set $\Psi$ which includes a codeword 0 and $W_b=0$ means that the $b^{th}$ TP is muted. Thus, SSPM is subsumed as a special case.

Then, let $R_u^b(\hat{W})$ denote an estimate of the average rate that user u can obtain (over the available time-frequency resource normalized to have size unity) when it is served data by TP b, given that the precoder tuple $\hat{W}$ is assigned to the B TPs and that no other user is associated with TP b. This time-frequency unit could for example be a set of resource blocks. Next, suppose that m total users are associated with TP b. Following the conventional approach, the average rate that user u can then obtain under proportional fair per-subframe scheduling can be approximated as $$\frac{R_u^b(\hat{W})}{m}.$$

With these definitions in hand, we can jointly determine the assignment of a precoding tuple and the user association (i.e., jointly consider semi-static coordinated beamforming (SSCB) and semi-static coordinated point-switching (SSPS) problems) by solving the following optimization problem:

$$\max_{\hat{W},[x_{u,b}]} \left\{ \sum_{u,b} x_{u,b} \log\left(\frac{R_u^b(\hat{W})}{\sum_k x_{k,b}}\right) \right\} \quad (P1)$$

$$\text{s.t.} \sum_b x_{u,b} = 1, \forall u; x_{u,b} \in \{0, 1\}, \forall u, b$$

$$\hat{W} = (W_1, \ldots, W_B), W_i \in \Psi, \forall i$$

Note that in (P1), each $x_{u,b}$ is an indicator variable which is equal to one if user u is associated with TP b and zero otherwise. Therefore the constraint in (P1) enforces that each user must be associated with only one TP. It can be shown that (P1) cannot be solved optimally in an efficient manner, which necessitates the design of low-complexity algorithms that can approximately solve (P1). For any given precoder tuple $\hat{W}$ the SSPS sub-problem can be optimally solved. Alternatively, a greedy approach can be adopted to achieve further complexity reduction.

These solutions to the SSPS problem can be leveraged to obtain an algorithm to sub-optimally solve the joint SSCB and SSPS problem (P1).

We next consider the SSPM-only problem where user associations are pre-determined.

$$\max_{\hat{W}} \left\{ \sum_{b, u \in S_b} \log\left(\frac{R_u^b(\hat{W})}{|S_b|}\right) \right\} \quad (P2)$$

$$\text{s.t.} \ \hat{W} = (W_1, \ldots, W_B), W_i \in \Psi, \forall i$$

Here $S_b$ denotes the pre-determined set of users associated to TP b and $|S_b|$ denotes its cardinality.

(P2) is also in general a hard problem which cannot be solved optimally in an efficient manner. Good heuristics can nevertheless be developed to solve (P2).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A wireless communication method implemented in a first base station, the wireless communication method comprising:
   communicating with a user equipment; and
   transmitting, to a second base station, Coordinated Multi-Point transmission (CoMP) information, wherein the CoMP information comprises a table described below:

| IE/Group Name | Presence | Range |
|---|---|---|
| CoMP Information Item | | 1 ... <maxnoofCoMPInformation> |
| >CoMP Hypothesis Set | M | |
| >Benefit Metric | M | |
| Start SFN | | |
| Start Subframe Index | | | wherein M denotes mandatory, and maxnoofCoMPinformation denotes a Maximum number of CoMP Hypothesis sets.

2. The wireless communications method according to claim 1, wherein the benefit metric is between a negative value and a positive value, inclusive.

3. The wireless communications method according to claim 1, wherein the CoMP Hypothesis Set includes at least an ID related to a cell.

4. The wireless communications method according to claim 1, wherein the CoMP Hypothesis Set includes at least a CoMP Hypothesis.

5. The wireless communications method according to claim 1, wherein the maxnoofCoMPinformation is 4, 8, 16, or 256.

6. The wireless communications method according to claim 1, wherein the CoMP information is transmitted via a X2 interface.

7. The wireless communications method according to claim 1, wherein the benefit metric is calculated on a liner scale.

8. The wireless communications method according to claim 1, wherein the benefit metric comprises null or special value indicating information other than benefit.

9. The wireless communications method according to claim 8, wherein the information is an unknown benefit.

10. The wireless communications method according to claim 1, wherein the benefit metric indicates a loss or cost when the benefit metric is a negative value.

11. A first base station comprising:
    a controller configured to communicate with a user equipment; and
    a transmission interface configured to transmit, to a second base station, Coordinated Multi-Point transmission (CoMP) information, wherein the CoMP information comprises a table described below:

| IE/Group Name | Presence | Range |
|---|---|---|
| CoMP Information Item | | 1 ... <maxnoofCoMPInformation> |
| >CoMP Hypothesis Set | M | |
| >Benefit Metric | M | |
| Start SFN | | |
| Start Subframe Index | | | wherein M denotes mandatory, and maxnoofCoMPinformation denotes a Maximum number of CoMP Hypothesis sets.

12. The first base station according to claim 11, wherein the benefit metric is between a negative value and a positive value, inclusive.

13. The first base station according to claim 11, wherein the CoMP Hypothesis Set includes at least an ID related to a cell.

14. The first base station according to claim 11, wherein the CoMP Hypothesis Set includes at least a CoMP Hypothesis.

15. The first base station according to claim 11, wherein the maxnoofCoMPinformation is 4, 8, 16, or 256.

16. The first base station according to claim 11, wherein the CoMP information is transmitted via a X2 interface.

17. The first base station according to claim 11, wherein the benefit metric is calculated on a liner scale.

18. The first base station according to claim 11, wherein the benefit metric comprises null or special value indicating information other than benefit.

19. The first base station according to claim 18, wherein the information is an unknown benefit.

20. The first base station according to claim 11, wherein the benefit metric indicates a loss or cost when the benefit metric is the negative value.

21. A wireless communication system comprising:

a first base station; and a second base station configured to transmit, to the first base station, Coordinated Multi-Point transmission (CoMP) information, wherein the CoMP information comprises a table described below:

| IE/Group Name | Presence | Range |
|---|---|---|
| CoMP Information Item | | 1 ... <maxnoofCoMPInformation> |
| >CoMP Hypothesis Set | M | |
| >Benefit Metric | M | |
| Start SFN | | |
| Start Subframe Index | | | wherein M denotes mandatory, and maxnoofCoMPinformation denotes a Maximum number of CoMP Hypothesis sets.

22. The wireless communication system according to claim 21, wherein the benefit metric is between a negative value and a positive value, inclusive.

* * * * *